N. C. DOSS.
COMPRESSION INNER TUBE.
APPLICATION FILED MAY 23, 1916.

1,197,805.  Patented Sept. 12, 1916.

Inventor
Noble C. Doss,

By C. L. Parker, Attorney

UNITED STATES PATENT OFFICE.

NOBLE C. DOSS, OF ROME, GEORGIA.

COMPRESSION INNER TUBE.

1,197,805. Specification of Letters Patent. Patented Sept. 12, 1916.

Application filed May 23, 1916. Serial No. 99,411.

*To all whom it may concern:*

Be it known that I, NOBLE C. DOSS, a citizen of the United States, residing at Rome, in the county of Floyd and State of Georgia, have invented certain new and useful Improvements in Compression Inner Tubes, of which the following is a specification.

My invention relates to improvements in compression or self-healing inner tubes, for double tube tires.

An important object of the invention is to provide an inner tube of the above mentioned character, having means for retaining its material under the maximum degree of compression, whereby punctures will be instantaneously closed or healed.

Other objects and advantages of the invention will be apparent during the course of the following description.

Figure 1:
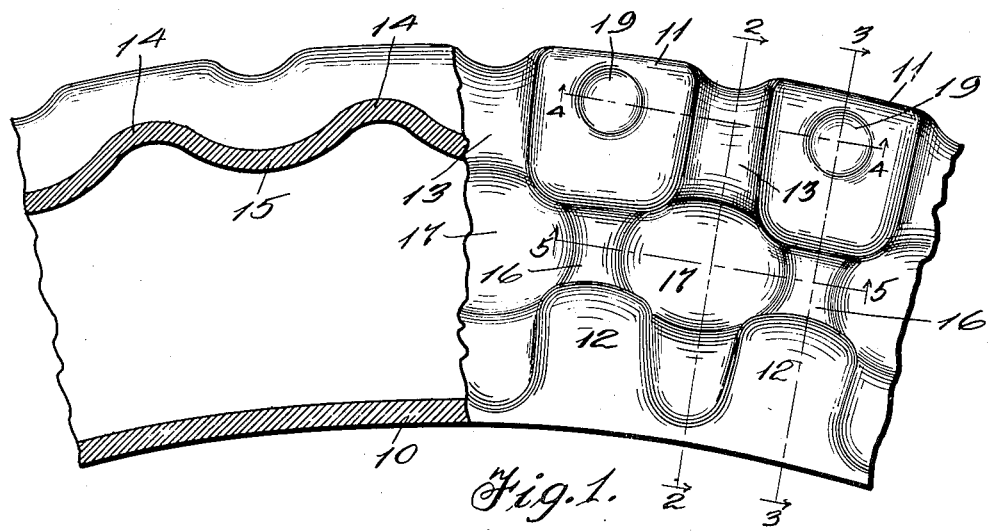
Figures 2, 3:
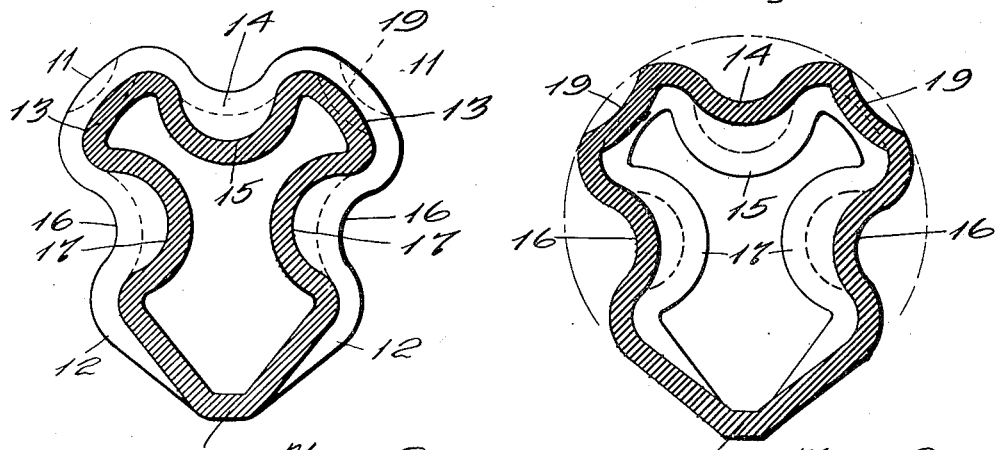
Figure 4:
Figure 5:

In the accompanying drawings forming a part of this specification and in which like numerals are employed to designate like parts throughout the same, Figure 1 is a side elevation partly in section, of a portion of my improved inner tube, Fig. 2 is a transverse sectional view taken on line 2—2 of Fig. 1, Fig. 3 is a similar view taken on line 3—3 of Fig. 1, Fig. 4 is a detail longitudinal section taken on line 4—4 of Fig. 1, and, Fig. 5 is a similar view taken on line 5—5 of Fig. 1.

In the drawings, wherein for the purpose of illustration is shown a preferred embodiment of my invention, the numeral 10 designates my improved inner tube, as a whole, which may be formed of rubber, rubber coated fabric, or a rubber compound or other suitable material. The tube 10 is provided upon its tread portion with raised portions 11 and upon its opposite sides with raised inner portions 12, arranged in annular sets, disposed in the plane of rotation of the tube. These raised portions are approximately square, and more or less flat. The raised portions 11 are longitudinally spaced by depressed concave portions 13, as shown. Formed in the central tread portion of the tube are longitudinally convex raised portions 14, disposed between the transverse pairs of raised portions 11 and depressed concave portions 15, arranged between the pairs of depressed portions 13, as shown. Disposed between the transverse pairs of raised portions 11 and 12 are longitudinally convex raised portions 16, connected and arranged alternately with longitudinally concaved depressions 17, disposed between the depressions 13 and concave depressions 17.

The raised tread portions 11 are approximately square and more or less flat, as above stated, and it has been found difficult to secure a sufficient degree of compression of material throughout these flat raised portions, so that the material thereof will properly function in closing a puncture. To overcome this objection I provide each raised portion 11, centrally thereof, with a substantially circular concave depression 19 which is spherically curved, as shown.

In the use of the inner tube, the same is arranged in the shoe of a double tube tire, in the usual manner. Before inflating, the inner tube is ordinarily slightly smaller in all dimensions than the shoe. When the inner tube is inflated, by virtue of its construction, it expands in all directions, whereby its entire area is placed under compression, the inner tube being larger when expanded than the interior of the shoe. The material of the raised tread portions 11 is subjected to a particularly high degree of compression, by virtue of the depressions 19 therein. It is thus apparent that if the inner tube is punctured, the material being under compression, the puncture is at once closed.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. A compression inner tube for a double tube tire, having its material provided with a plurality of rows of alternating elevated and depressed portions, said elevated portions being provided with depressions.

2. A compression inner tube for a double tube tire, comprising a plurality of rows of alternate raised and depressed portions, each raised portion being provided substantially centrally thereof with a depression, said tube having an annular depression between said rows and said annular depression being provided with a plurality of supplemental depressions.

In testimony whereof I affix my signature in presence of two witnesses.

NOBLE C. DOSS.

Witnesses:
GEO. W. TRAMMELL,
D. C. BRYAN.